(12) United States Patent
Pandy et al.

(10) Patent No.: US 9,231,268 B2
(45) Date of Patent: Jan. 5, 2016

(54) FLOW BATTERY SYSTEM WITH STANDBY MODE

(75) Inventors: Arun Pandy, Manchester, CT (US); Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1020 days.

(21) Appl. No.: 13/331,407

(22) Filed: Dec. 20, 2011

(65) Prior Publication Data

US 2013/0157087 A1 Jun. 20, 2013

(51) Int. Cl.
*H01M 8/18* (2006.01)
*H01M 8/20* (2006.01)
*H01M 8/04* (2006.01)

(52) U.S. Cl.
CPC .......... *H01M 8/188* (2013.01); *H01M 8/04186* (2013.01); *H01M 8/04201* (2013.01); *H01M 8/04223* (2013.01); *H01M 8/04753* (2013.01); *H01M 8/20* (2013.01); *H01M 8/04179* (2013.01); *H01M 8/04231* (2013.01); *Y02E 60/528* (2013.01)

(58) Field of Classification Search
CPC ....... H01M 8/04; H01M 8/20; H01M 8/4223; H01M 8/04298; H01M 4/04082; H01M 8/04186; H01M 8/04201; H01M 8/04753; H01M 8/04798; H01M 8/188
See application file for complete search history.

(56) References Cited

U.S. PATENT DOCUMENTS

| | | | | |
|---|---|---|---|---|
| 3,245,836 | A * | 4/1966 | Agruss | 429/419 |
| 4,786,567 | A | 11/1988 | Skyllas-Kazacos et al. | |
| 6,355,373 | B1 * | 3/2002 | Pauling | 429/75 |
| 6,692,862 | B1 * | 2/2004 | Zocchi | 429/50 |
| 7,105,245 | B2 * | 9/2006 | Ohlsen et al. | 429/506 |
| 7,820,321 | B2 | 10/2010 | Horne et al. | |
| 7,976,974 | B2 | 7/2011 | Kazacos et al. | |
| 2008/0115930 | A1 * | 5/2008 | Peters et al. | 166/248 |
| 2009/0071841 | A1 * | 3/2009 | Pal et al. | 205/638 |
| 2010/0104904 | A1 * | 4/2010 | Rao et al. | 429/21 |
| 2011/0006737 | A1 | 1/2011 | Saligram et al. | |
| 2011/0074357 | A1 * | 3/2011 | Parakulam et al. | 320/134 |
| 2011/0087389 | A1 * | 4/2011 | Burleigh et al. | 701/22 |
| 2011/0119005 | A1 * | 5/2011 | Majima et al. | 702/63 |

(Continued)

FOREIGN PATENT DOCUMENTS

| | | | | |
|---|---|---|---|---|
| JP | 2002175822 | A | 6/2002 | |
| JP | 2003-079070 | | * 3/2003 | ............ H01M 10/44 |
| JP | 2003079070 | | 3/2003 | |
| JP | 2006-313691 | | * 11/2006 | ............. H01M 8/18 |
| JP | 2006313691 | | 11/2006 | |

OTHER PUBLICATIONS

International Search Report and Written Opinion for PCT/US2012/070286, dated Feb. 28, 2012.

(Continued)

*Primary Examiner* — Ula C Ruddock
*Assistant Examiner* — Amanda Barrow
(74) *Attorney, Agent, or Firm* — Carlson, Gaskey & Olds, P.C.

(57) ABSTRACT

A flow battery system includes an ON mode, and OFF mode and a STANDBY mode. The ON mode enables access to a full energy capacity of the flow battery system with regard to an amount of electric power that can be drawn from or stored to the flow battery system. The OFF mode disables access to the full energy capacity and the STANDBY mode enables access to a portion of the full energy capacity.

11 Claims, 3 Drawing Sheets

(56) References Cited

U.S. PATENT DOCUMENTS

| | | | |
|---|---|---|---|
| 2011/0143249 A1* | 6/2011 | Izawa et al. | 429/441 |
| 2011/0223451 A1* | 9/2011 | Winter et al. | 429/80 |
| 2011/0248653 A1* | 10/2011 | Brotto et al. | 318/139 |
| 2011/0274948 A1* | 11/2011 | Duduta et al. | 429/50 |

OTHER PUBLICATIONS

International Preliminary Report on Patentability for International Application No. PCT/US2012/070286 mailed Jul. 3, 2014.

* cited by examiner

FLOW BATTERY SYSTEM WITH STANDBY MODE

BACKGROUND

This disclosure relates to flow batteries for selectively storing and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A basic flow battery includes a redox flow cell that has a negative electrode and a positive electrode separated by an electrolyte layer, which may include separator such as an ion-exchange membrane. A negative liquid electrolyte is circulated through the negative electrode and a positive liquid electrolyte is circulated through the positive electrode to drive electrochemically reversible redox reactions. Upon charging, the electrical energy supplied causes a chemical reduction reaction in one electrolyte and an oxidation reaction in the other electrolyte. The separator prevents the electrolytes from mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, liquid electrolytes that participate in a reversible electrochemical reaction.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1A:
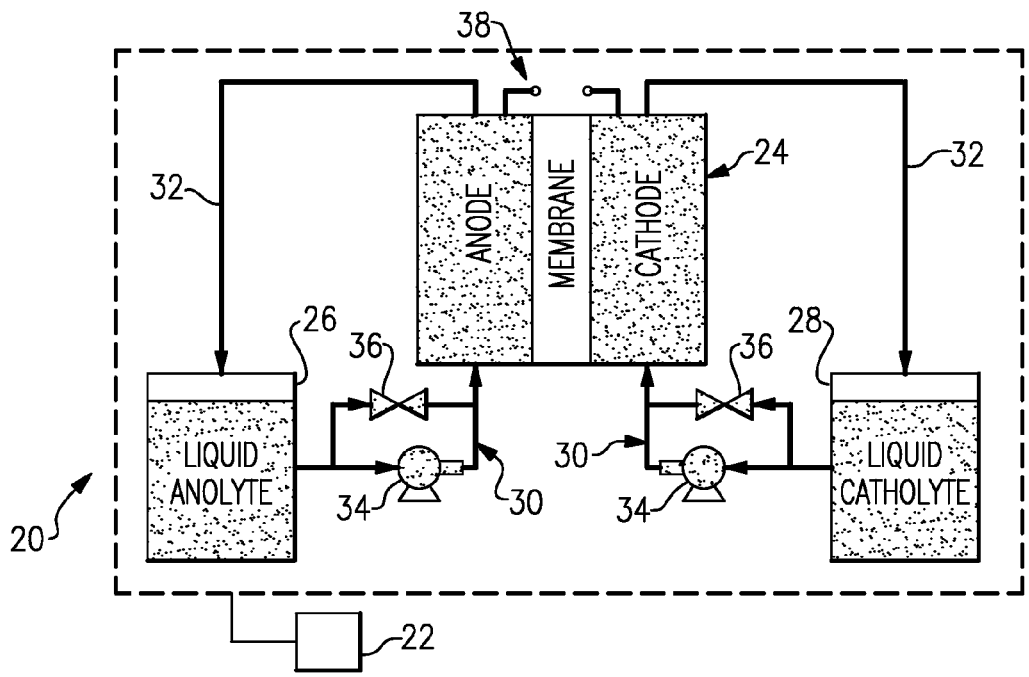
FIG. 1A shows an example flow battery system in an ON mode.
Figure 2:
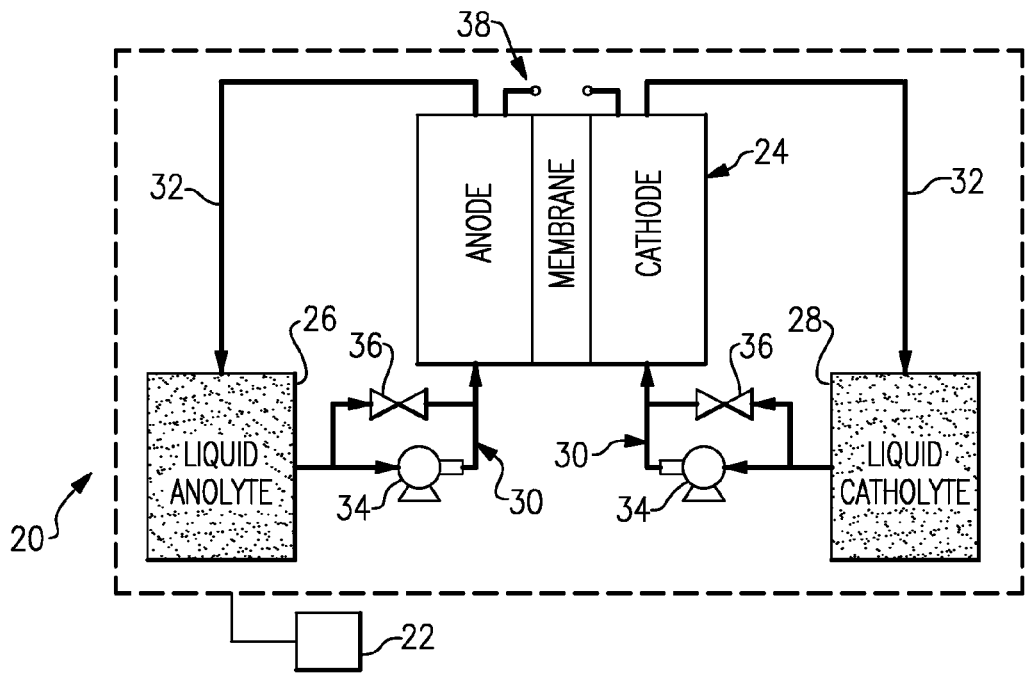
FIG. 2 illustrates the flow battery system in an OFF mode.
Figure 3:
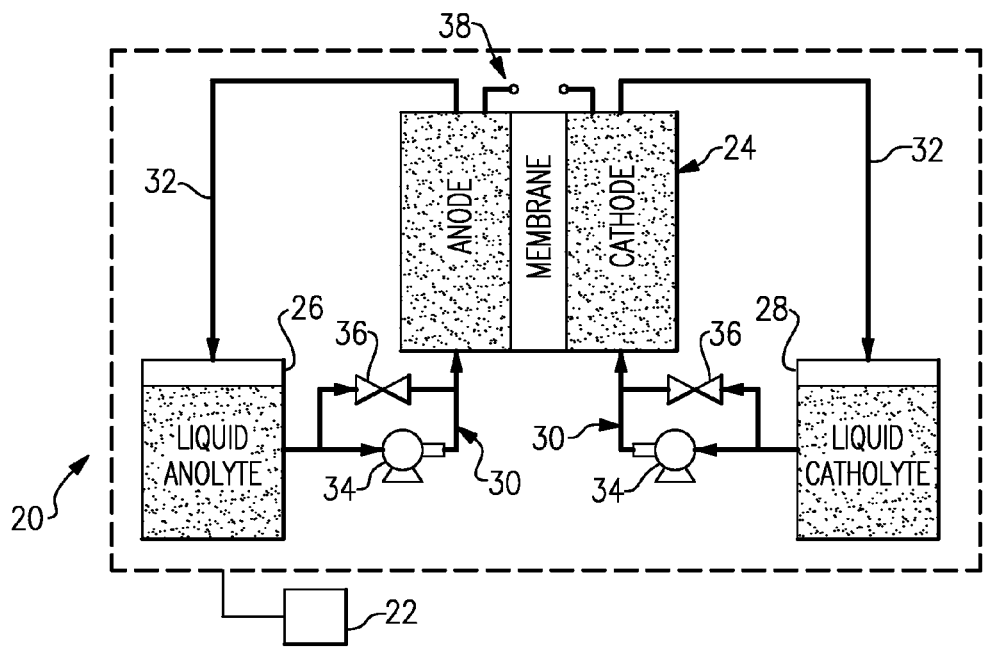
FIG. 3 illustrates the flow battery system in a STANDBY mode.

FIGS. 1A, 2 and 3 show selected portions of an example flow battery system 20 having enhanced capabilities compared to prior flow battery systems. As an example, the flow battery system 20 may be used to convert electrical energy generated in a renewable energy system, such as a wind-powered system, to chemical energy that is stored until a later time when there is greater demand at which the flow battery system 20 then converts the chemical energy back into electrical energy. The flow battery system 20 may supply the electric energy to an electric grid, for example.

Prior flow battery systems operate in one of two modes, an ON mode and an OFF mode. In the ON mode, a liquid anolyte and a liquid catholyte are circulated from respective storage tanks into and through an electrochemical cell during which power is drawn from or stored to the liquid anolyte and the liquid catholyte. To prevent self-discharge of the flow battery system during a period of time when power is not being drawn from or stored to the flow battery system, the flow battery system is switched from the ON mode into the OFF mode.

In the OFF mode, the liquid anolyte and the liquid catholyte are emptied from the electrochemical cell into the respective storage tanks. This prevents self-discharge of the flow battery system due to diffusion of the electrochemically active species through an ion-exchange membrane in the electrochemical cell. A drawback of switching into the OFF mode is that if there is a demand to draw electric power from or store electric power to the flow battery system, the prior art flow battery system is slow to react. In other words, to access the energy capacity of the prior art flow battery system, the system must circulate the liquid anolyte and the liquid catholyte through the electrochemical cell. Thus, the ability to draw electric power from or store electric power to the prior art flow battery system is delayed by the amount of time that it takes for any auxiliary components to start up and then circulate the anolyte/catholyte from the respective storage tanks into the electrochemical cell. Such a delay increases the amount of time required to fully charge or discharge the prior art flow battery system and the rate at which the electric power output can be changed.

As will be described in further detail below, the disclosed flow battery system 20 provides a third mode, a STANDBY mode, that enables instant or near instant access to a portion of the full capacity of the flow battery system 20 when it is not in either of the ON mode or the OFF mode.

Referring to FIG. 1A, the flow battery system 20 is shown in an ON mode. A controller 22 within the flow battery system 20 controls switching between the ON mode, the OFF mode and the STANDBY mode. The controller 22 includes software, hardware or both. In one example, the controller 22 is a computer that has software to control the operation of the flow battery system 20. Given this description, one skilled in the art would understand how to implement the disclosed controller 22.

As shown, the flow battery system 20 includes a liquid anolyte and a liquid catholyte that function as a redox pair in the electrochemical reaction that takes place within an electrochemical cell 24. For example, the electrochemically active species of the liquid anolyte and the liquid catholyte are based on vanadium, bromine, iron, chromium, zinc, cerium, lead or combinations thereof. In embodiments, the liquid anolyte and the liquid catholyte are aqueous solutions that include one or more of the electrochemically active species disclosed above.

The liquid anolyte and the liquid catholyte are contained in respective external storage portions 26 and 28. As shown, the external storage portions 26 and 28 are substantially equivalent cylindrical storage tanks. However, the external storage portions 26 and 28 can alternatively have other shapes and sizes. Additionally, the external storage portions 26 and 28 are shown in FIG. 1A as being located below the electrochemical cell or cells 24, however, in alternate arrangements the external storage portions 26 and 28 can be above the cell or cells 24 or at the same vertical level as the cell or cells 24

The liquid anolyte and the liquid catholyte are delivered (e.g., pumped) to the one or more cells 24 of the flow battery system 20 through respective feed lines 30 and are returned from the cell or cells 24 to the external storage portions 26 and 28 by return lines 32.

In the illustrated example, each of the feed lines 30 includes a pump 34 and a valve 36 that are arranged in parallel within the feed line 30. The controller 22 is electrically connected with at least the valves 36 and the pumps 34 to control the operation thereof. The controller 22 may also be electrically connected with other auxiliary components within the flow battery system 20, including an electrical pathway 38 that completes a circuit within the one or more cells 24 to allow the completion of the electrochemical redox reaction therein.

Figure 1B:
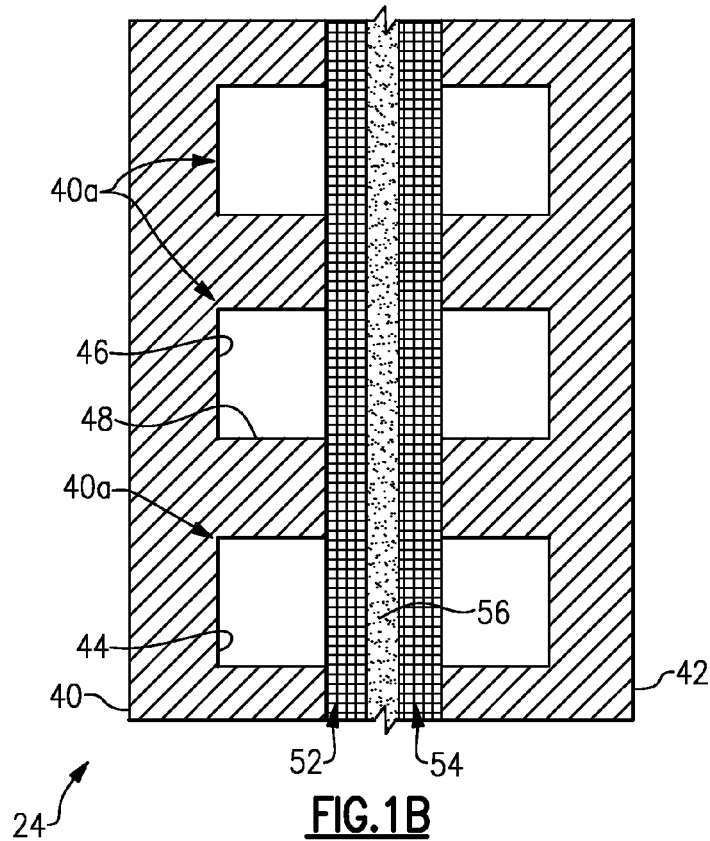
FIG. 1B shows an example electrochemical cell of a flow battery.

FIG. 1B shows a cross-section of a portion of one of the cells 24. It is to be understood that the flow battery 20 can include a plurality of such cells 24 in a stack, depending on the designed capacity of the flow battery 20. As shown, the cell 24 includes a first bipolar plate 40 and a second bipolar plate 42 spaced apart from the first bipolar plate 40. The bipolar plates 40 and 42 are electrically conductive and can be graphite plates or metallic plates, for example.

The first bipolar plate 40 includes a plurality of channels 40a, which include a first channel 44 and a second, adjacent channel 46 that is separated from the first channel 44 by a rib 48. In this example, the configuration of the second bipolar plate 42 is substantially similar to the first bipolar plate 40, although it is conceivable that the second bipolar plate 42 could alternatively have a dissimilar configuration.

Porous electrodes 52 and 54 are arranged immediately adjacent the respective first and second bipolar plates 40 and 42. Thus, the porous electrode 52 is in contact with the face of the first bipolar plate 40 and the porous electrode 54 is in contact with the face of the second bipolar plate 42. A separator, such as an ion-exchange membrane, 56 is arranged between the porous electrodes 52 and 54.

One or both of the porous electrodes 52 or 54 include an electrically conductive material that is also catalytically active with regard to the liquid anolyte and catholyte, such as carbon or carbon with dispersed catalyst materials such as platinum or nickel. That is, the surfaces of the electrode material are catalytically active in the flow battery 20. In the redox reactions of the flow battery 20, the energy barrier to the reaction is relatively low, and thus stronger catalytic materials, such as noble metals or alloys, are not typically required, as with electrochemical devices that utilize gaseous reactants such as oxygen or hydrogen. In one embodiment, the electrode material is carbon and it is activated using a prior thermal and/or chemical treatment process to clean the carbon material and produce carbon surfaces that serve as improved active catalytic sites. It is to be understood that the bipolar plates 40 and 42 and the channels 40a are optional in the flow battery 20. That is, the flow battery 20 can alternatively be configured for "flow-through" operation where the electrolytes are pumped directly into the electrodes 52 and 54 without the use of flow field channels.

As indicated above, the controller 22 selectively switches the flow battery system 20 between the ON mode, the OFF mode and the STANDBY mode. For example, the controller 22 may switch between these modes in response to a forecast for demand of electric power and/or in response to a condition of a renewable or intermittent energy source, such as a wind-powered energy source, which is connected for operation with the flow battery system 20. In general, the STANDBY mode thereby provides the ability for quick response in systems with uncertain power demands, which can be either power input or output from the battery.

The ON mode enables access to the full energy capacity of the flow battery system 20 by circulating the liquid anolyte and the liquid catholyte from, respectively, the external storage portions 26 and 28 into and through the electrochemical cell 24. Thus, during circulation of the liquid anolyte and the liquid catholyte, the flow battery system 20 can be fully charged, or fully discharged using the electrical pathway 38.

In the ON mode, the controller 22 turns on the pumps 34 and closes the valves 36 such that the liquid anolyte and the liquid catholyte flow into and through the electrochemical cell 24 and recirculate back into the respective external storage portions 26 and 28 for another circulation cycle. In the electrochemical cell 24, the liquid anolyte and the liquid catholyte flow through the channels 40a of the respective bipolar plates 40 and 42 and manifolds (not shown).

FIG. 2 shows the flow battery system 20 in the OFF mode. The OFF mode disables access to the full energy capacity by substantially emptying at least one of the liquid anolyte or the liquid catholyte from the electrochemical cell 24. In some examples, both the liquid anolyte and the liquid catholyte are emptied from the electrochemical cell 24.

In the OFF mode, the controller 22 turns the one or both of the pumps 34 off and opens one or both of the valves 36 such that substantially all of the liquid anolyte and/or the liquid catholyte drain from the electrochemical cell 24 back into the respective external storage portions 26 and 28. Thus, in the OFF mode, the channels 40a and manifolds of the electrochemical cell 24 are completely or substantially emptied of at least one of the electrolytes. Depending on the arrangement of the electrochemical cell 24 stacks and the storage portions 26 and 28, there may be other methods to empty the electrochemical cell 24 stacks of the bulk of the electrolyte solutions. For example, if the electrochemical cell 24 stacks are not lower than the storage portions 26 and 28, then the pumps 34 can be used to empty the electrochemical cell 24 stacks.

In the OFF mode, since at least one of the liquid anolyte or the liquid catholyte or both the liquid anolyte and liquid catholyte are not present in or circulated through the electrochemical cell 24, there is no ability to draw electric power from or store electric power to the flow battery system 20. Additionally, self-discharge of the flow battery system 20 is substantially reduced since the reactants are not in direct contact anywhere in the system; however, there may still be a small amount of unintended, low-rate self-discharging due to reaction with air, if present (due to permeation through seals or if an active inert-purge gas is not employed to prevent air intrusion).

FIG. 3 shows the flow battery system 20 in the STANDBY mode. The STANDBY mode enables access to a portion of the full energy capacity without circulating the liquid anolyte or the liquid catholyte into and through the electrochemical cell 24 by storing portions of the liquid anolyte and the liquid catholyte in the electrochemical cell 24. It is to be appreciated that the "portion" of the full energy capacity refers to an amount less than 100% capacity. In FIGS. 1-3, the electrochemical cell 24, valves 36 and the pumps 34 are selectively shaded to indicate that they contain or do not contain electrolyte. That is, where shaded, the electrochemical cell 24 contains electrolyte, the valves 36 are open and the pumps 34 are on.

In the STANDBY mode, the controller 22 turns the pumps 34 off and closes the valves 36. Thus, the liquid anolyte and the liquid catholyte that are present within the electrochemical cell 24 are unable to flow back into the respective external storage portions 26 and 28. That is, those portions of the liquid anolyte and the liquid catholyte are stored within the electrochemical cell 24, such as in the electrodes 52 and 54 and/or channels 40a, and at least a portion of the feed lines 30 and manifolds. The portions of a liquid anolyte and the liquid catholyte are held for a period of time within the electrochemical cell 24, during which, no power is drawn from or stored to the liquid anolyte and the liquid catholyte. As can be appreciated, the volume capacity of the electrodes and/or flow field channels and/or manifolds can be selected to enhance the storage capacity of the electrochemical cell 24.

The storing of the liquid anolyte and the liquid catholyte within the electrochemical cell 24 in STANDBY mode enables access to a portion of the full energy capacity of the flow battery system 20 without circulating the liquid anolyte or the liquid catholyte through the cell 24. That is, the liquid anolyte and the liquid catholyte stored within the electrochemical cell 24 have a capacity to have power drawn from them or store power to them in order to meet an instantaneous demand.

Figure 4:
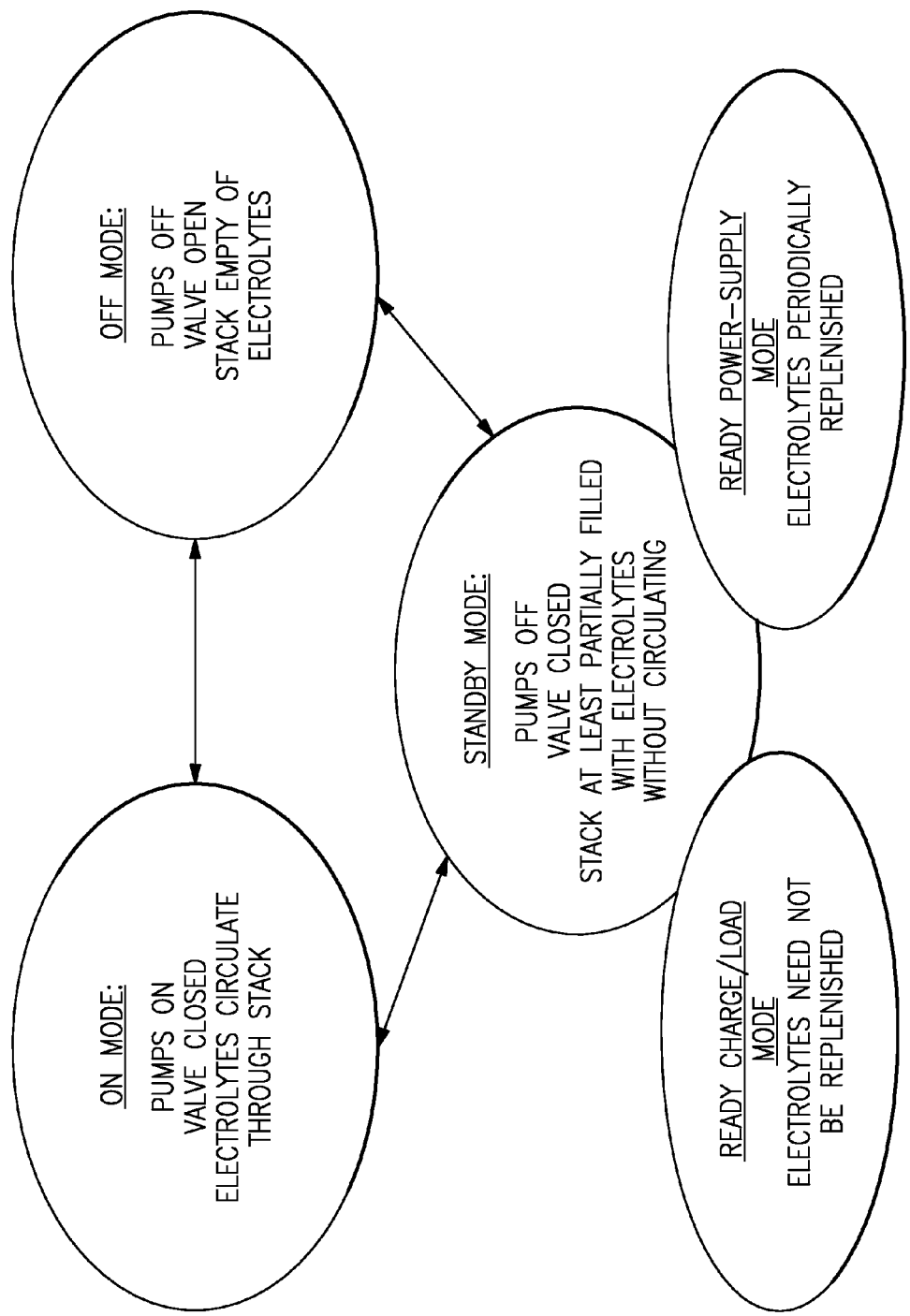
FIG. 4 illustrates an example logic diagram for operating a flow battery among an ON mode, OFF mode and STANDBY mode.

FIG. 4 shows an example logic diagram for operating the flow battery system 20 among the ON mode, the OFF mode and the STANDBY mode. As described, the controller 22 controls the operation of the pumps 34 and the valves 36 to change between modes with respect to whether the electrolytes circulate through the electrochemical cell 24, are emptied from the electrochemical cell 24 or at least partially fill the electrochemical cell 24 without circulating. In a further example, as also depicted in FIG. 4, the controller 22 periodically switches the flow battery system 20 from the STANDBY mode to the ON mode for a short period of time in order to replenish the electrolytes within the electrochemical cell 24 (which will otherwise slowly self-discharge) in order to ensure that the system will be ready to deliver power in the STANDBY mode. As an example, this concept is used in combination with the flow battery system 20 serving an Uninterruptible Power Supply function or acting to improve local power quality. Alternatively, if the desire is to maintain the flow battery system 20 for receiving power (i.e., charge) then this periodic replenishment would not be needed since fully discharged reactants in the stack are acceptable.

In one example, the controller 22 places the flow battery system 20 in the STANDBY mode in response to a forecast for a demand of the electric power. That is, in anticipation of the possibility that power will be drawn from or stored to the flow battery system 20, the controller 22 places the flow battery system 20 in the STANDBY mode. Thus, at any instant, the flow battery system 20 has the ability to provide power or have power stored to it without delay from having to wait for the pumps 34 to start up and circulate the liquid anolyte and the liquid catholyte into the electrochemical cell 24. In that regard, the flow battery system 20 disclosed herein provides a rapid response time and a higher rate at which power can be changed and can be used to offset transmission and distribution capacity that utilizes wires and transformers that respond instantaneously.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery system comprising a controller programmed with an ON mode, an OFF mode and a STANDBY mode, the ON mode enabling access to a full energy capacity of the flow battery system with regard to an amount of electric power that can be drawn from or stored to the flow battery system, the OFF mode disabling access to the full energy capacity and the STANDBY mode enabling access to a portion of the full energy capacity by storing portions of a liquid anolyte and a liquid catholyte in an electrochemical cell of the flow battery system, and the controller also being programmed to periodically replenish the liquid anolyte and the liquid catholyte in the electrochemical cell to maintain an ability of the flow battery system to deliver electrical power on-demand from the portion of the full energy capacity while in the STANDBY mode.

2. The flow battery system as recited in claim 1, wherein the controller is programmed to replenish the liquid anolyte and the liquid catholyte in the electrochemical cell in response to self-discharge of the liquid anolyte and the liquid catholyte.

3. The flow battery system as recited in claim 1, wherein the controller is programmed to place the flow battery system in the STANDBY mode in response to a forecast for a demand of the electrical power to be drawn from the flow battery system.

4. A flow battery system comprising:

a liquid anolyte and a liquid catholyte that define a full energy capacity with regard to an amount of electric power that can be drawn from or stored to the liquid anolyte and the liquid catholyte;

an electrochemical cell;

a first external storage portion and a second external storage portion each fluidly connected with the electrochemical cell for storing, respectively, the liquid anolyte and the liquid catholyte; and a controller programmed with an ON mode, an OFF mode and a STANDBY mode, wherein the ON mode enables access to the full energy capacity by circulating the liquid anolyte and the liquid catholyte from, respectively, the first external storage portion and the second external storage portion through electrochemical cell, the OFF mode disables access to the full energy capacity by substantially emptying at least one of the liquid anolyte or the liquid catholyte from the electrochemical cell and the STANDBY mode enables access to a portion of the full energy capacity without circulating the liquid anolyte or the liquid catholyte into the electrochemical cell by storing portions of the liquid anolyte and the liquid catholyte in the electrochemical cell, the controller also being programmed to periodically replenish the liquid anolyte and the liquid catholyte in the electrochemical cell to maintain an ability of the flow battery system to deli ver electrical power on-demand from the portion of the full energy capacity while in the STANDBY mode.

5. The flow battery system as recited in claim 4, including feed lines connected, respectively, between the first external storage portion and the electrochemical cell and between the second external storage portion and the electrochemical cell, each feed line including a valve and a pump arranged in parallel.

6. The flow battery system as recited in claim 4, wherein the controller is programmed to replenish the liquid anolyte and the liquid catholyte in the electrochemical cell in response to self-discharge of the liquid anolyte and the liquid catholyte.

7. The flow battery system as recited in claim 4, wherein the controller is programmed to place the flow battery system in the STANDBY mode in response to a forecast for a demand of the electrical power to be drawn from the flow battery system.

8. A method for use with a flow battery system comprising a liquid anolyte and a liquid catholyte that define a full energy capacity with regard to an amount of electric power that can be drawn from or stored to the liquid anolyte and the liquid catholyte, an electrochemical cell and a first external storage portion and a second external storage portion that are each fluidly connected with the electrochemical cell for storing, respectively, the liquid anolyte and the liquid catholyte, the method comprising:

operating in an ON mode to enable access to the full energy capacity of the liquid anolyte and the liquid catholyte by circulating the liquid anolyte and the liquid catholyte from, respectively, the first external storage portion and the second external storage portion through electrochemical cell;

operating in an OFF mode to disable access to the full energy capacity by substantially emptying at least one of the liquid anolyte or the liquid catholyte from the electrochemical cell;

operating in a STANDBY mode to enable access to a portion of the full energy capacity without circulating the liquid anolyte or the liquid catholyte into the electrochemical cell by storing portions of the liquid anolyte and the liquid catholyte in the electrochemical cell; and periodically replenishing the liquid anolyte and the liquid catholyte in the electrochemical cell to maintain an ability of the flow battery system to deliver electrical power on-demand from the portion of the full energy capacity while in the STANDBY mode.

9. The method as recited in claim 8, including operating in the STANDBY mode in response to a forecast for a demand of the electric power.

10. The method as recited in claim 8, including operating in the STANDBY mode in response to a forecast for a storage of the electric power from an intermittent power source.

11. The method as recited in claim 8, including drawing electric power from or storing electric power to the liquid anolyte and the liquid catholyte while operating in the STANDBY mode.

* * * * *

UNITED STATES PATENT AND TRADEMARK OFFICE
CERTIFICATE OF CORRECTION

PATENT NO.        : 9,231,268 B2
APPLICATION NO.   : 13/331407
DATED             : January 5, 2016
INVENTOR(S)       : Arun Pandy Page 1 of 1

It is certified that error appears in the above-identified patent and that said Letters Patent is hereby corrected as shown below:

IN THE CLAIMS;

In claim 4, column 6, line 50; delete "deli ver" and replace with --deliver--

Signed and Sealed this
Twenty-sixth Day of April, 2016

Michelle K. Lee
*Director of the United States Patent and Trademark Office*